United States Patent [19]
Pierson

[11] 3,941,349
[45] Mar. 2, 1976

[54] ELECTROMECHANICALLY ACTUATED GATE VALVE APPARATUS
[76] Inventor: Michael L. Pierson, 3714 W. Morten, Phoenix, Ariz. 85009
[22] Filed: July 3, 1974
[21] Appl. No.: 485,513

[52] U.S. Cl. .............. 251/100; 251/130; 251/144; 251/138; 251/326
[51] Int. Cl.² ........................................ F16K 31/10
[58] Field of Search .......... 251/144, 130, 138, 326, 251/129, 100

[56] References Cited
UNITED STATES PATENTS

| | | | |
|---|---|---|---|
| 1,117,894 | 11/1914 | Orbin | 251/129 X |
| 2,549,204 | 4/1951 | Kaddatz | 251/129 X |
| 3,333,814 | 8/1967 | Sargent | 251/326 X |
| 3,583,675 | 6/1971 | Palmer | 251/144 |

FOREIGN PATENTS OR APPLICATIONS

| | | | |
|---|---|---|---|
| 546,817 | 9/1922 | France | 251/138 |

*Primary Examiner*—Arnold Rosenthal
*Attorney, Agent, or Firm*—H. Gordon Shields

[57] ABSTRACT

Gate valve apparatus is disclosed for use with holding tanks, such as on recreational vehicles, which utilizes electromechanical means to open and to close the valve.

3 Claims, 14 Drawing Figures

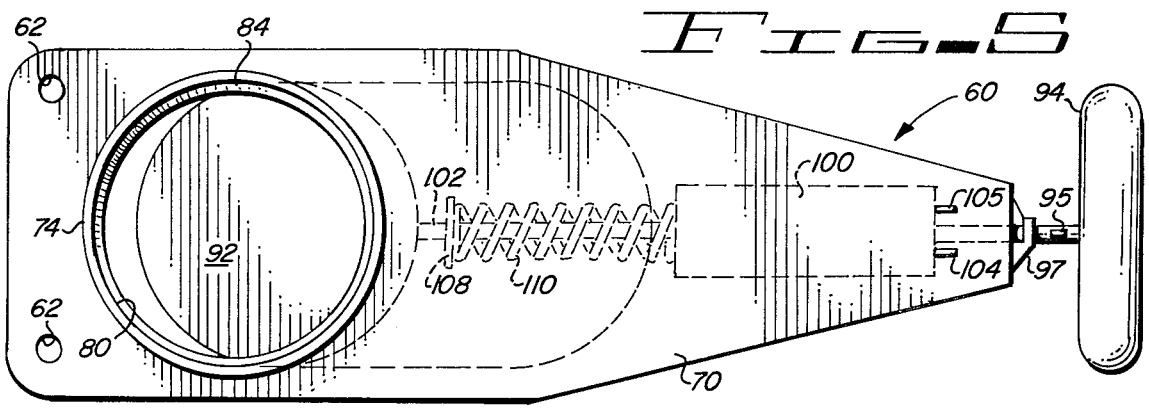
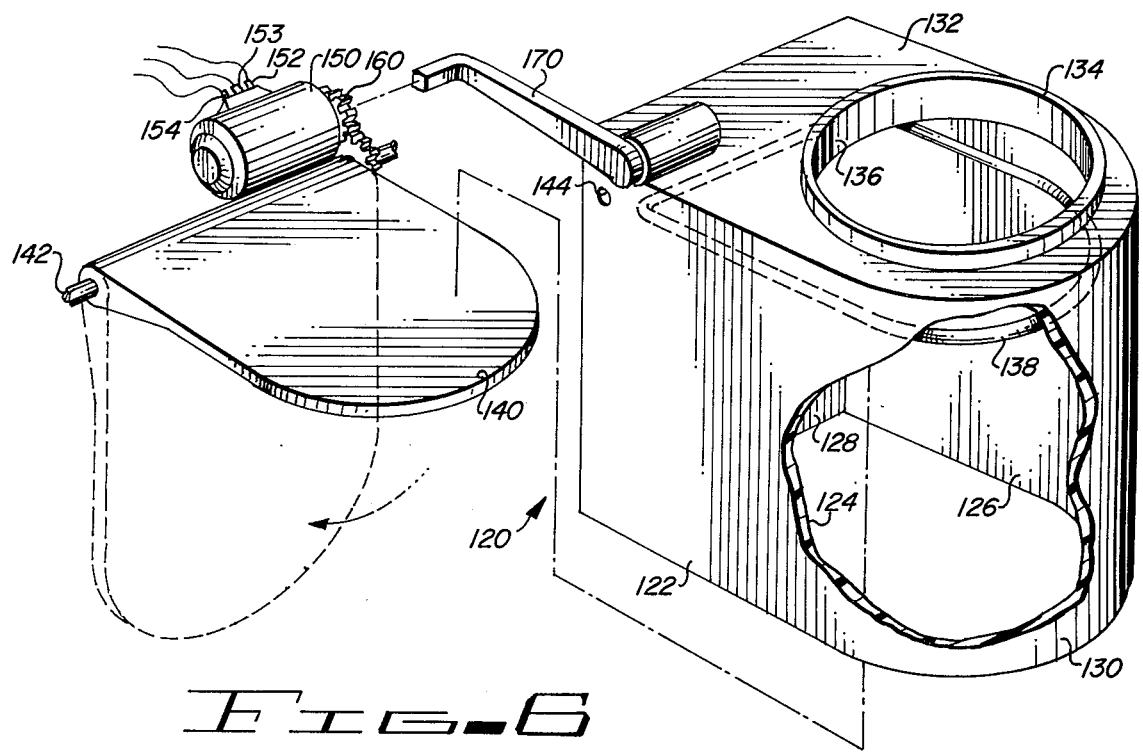
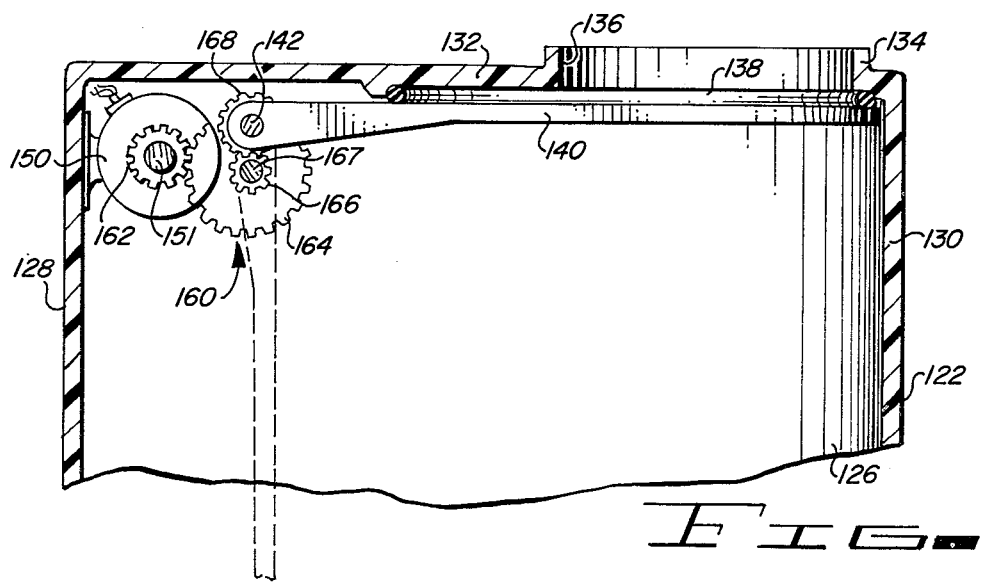

ELECTROMECHANICALLY ACTUATED GATE VALVE APPARATUS

BACKGROUND OF THE INVENTION

1. Field of the Invention

This invention relates to gate valves, and, more particularly, to electromechanically actuable gate valves for use on holding tanks of recreational vehicles.

2. Description of the Prior Art

Holding tanks on mobile homes, campers, and other types of recreational vehicles have been used for many years. However, heretofore, such holding tanks have been drained by hand-operated gate valves. That is, the user of the apparatus has to manually open the gate valve from the exterior of the vehicle and then flush the holding tank from the interior of the vehicle. This requires either two people, one inside and one outside the vehicle, or else one individual must accomplish the task by moving the outside of the vehicle after the gate valve is opened, to the inside of the vehicle to flush the holding tank out, and then moving once again to the outside of the vehicle, after the tank has been fully flushed, in order to manually close the gate valve.

Alternatively, the line is opened until the holding tank is drained, then the valve is closed. The holding tank is refilled by adding water, then the valve is opened to again drain the holding tank. This procedure is repeated until the holding tank is sufficiently clean to allow the addition of appropriate chemicals.

When a recreational vehicle drives into a campground, trailer court, or the like, a connection is usually available to allow drainage of the holding tank. After the connection is made, the gate valve must be opened to allow draining and flushing of the holding tank. Since both opening and closing of the gate valve has heretofore been accomplished manually, there is an added inconvenience when the opening or closing of the valve must be accomplished at night in the dark. The necessity for both manually opening and manually closing the valve is an additional inconvenience.

SUMMARY OF THE INVENTION

The invention described and claimed herein comprises a gate valve electromechanically actuable by a solenoid or by a motor to both the open and the closed positions of the valve. In addition to the electromechanical actuation, means are also provided for manually operating the valve. Several embodiments of such valve apparatus are described and claimed. The valve apparatus is designed for use in recreational vehicles for the draining or flushing of holding tanks. Accordingly, the valve must open completely to allow unrestricted flow from the holding tank and must present no impairment to any such flow.

Among the objects of the present invention are the following:

To provide new and useful valve apparatus;

To provide new and useful gate valve apparatus;

To provide new and useful electromechanically actuable valve apparatus;

To provide new and useful valve apparatus actuated by an electrical solenoid;

To provide new and useful valve apparatus actuable by an electric motor;

To provide new and useful valve apparatus actuable by a two-positioned solenoid; and To provide new and useful valve apparatus electrically operable from a remote position.

BRIEF DESCRIPTION OF THE DRAWING

FIG. 5 is a vertical view of the apparatus of FIG. 4.

FIG. 6 is a view in partial section and partially broken away of an alternate embodiment of apparatus comprising the present invention.

FIG. 7 is a view in partial section of a portion of the apparatus of FIG. 6.

DESCRIPTION OF THE PREFERRED EMBODIMENT

Figure 1:
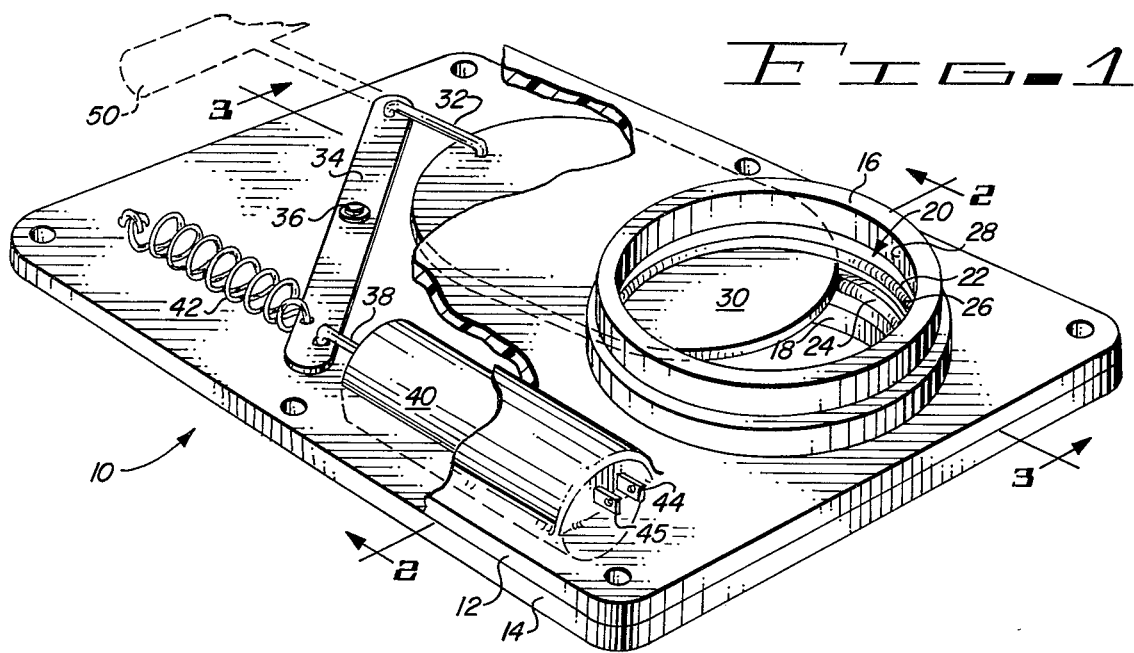
FIG. 1 is an isometric view of valve apparatus embodying the present invention.

FIG. 1 is an isometric view of valve apparatus 10 embodying the present invention. The valve apparatus 10 includes a gate valve and a typical employment of such valve is at the holding tank of a recreational vehicle. The valve apparatus includes an upper housing 12 and a lower housing 14, secured together and to a holding tank by appropriate fastening means. A plurality of holes or apertures are shown in alignment with each other in FIG. 1. Fasteners, such as bolts, may be inserted through the apertures to secure the valve apparatus to the holding tank or at an appropriate position with respect thereto.

The upper housing 12 includes an upper valve boss 16, and the lower housing 14 includes a lower boss 18. The valve bosses extend away from the respective valve housings and may be used to secure a connecting drain hose or the like to the valve body. The upper valve boss may extend into a matching portion of a holding tank. The valve bosses are generally circular or annular in configuration and are preferably several inches in diameter. Both the interior and exterior dimensions of the bosses are relatively standard in the industry and are designed to mate with appropriate drain hoses and fittings. The interior of the valve bosses define a channel or passage 28 through which the waste from the holding tank flows.

Within the interior of the bosses, and disposed in matching grooves at the juncture of the upper and lower housings in an annular seal 20. The seal is disposed about the interior periphery of the valve bosses. The seal 20 includes an upper annulus 22 and a lower annulus 24, with a groove 26 disposed between them. The groove 26 receives a slideable valve gate 30.

When the valve gate is in position, it sealingly is engaged by the upper annulus and by the lower annulus to effect a seal to prevent the flow of fluid through the channel 28.

The valve gate is located in an appropriate groove between the upper and lower housings. A rod 32 is secured to the valve gate 30 and extends from the valve gate to one end of a pivoting actuator rod 34. The rod 34 pivots about a pivot point 36 and is connected to a solenoid plunger rod 38 at a location remote from the rod 32. That is, the rods 32 and 38 are connected to opposite ends of the actuator rod 34.

The solenoid plunger rod 38 is movable within a solenoid 40. The solenoid 40 is also located in appropriate matching grooves within the upper and lower housings 12 and 14.

A tension spring 42 extends from the actuator rod 34 adjacent the connection with solenoid plunger rod 38 to a fixed location, shown in FIG. 1, on lower housing 14. The spring serves to provide a bias on actuator rod 34 to maintain the valve gate 30 in the closed position. The bias of the spring is opposed by actuation of the solenoid to draw the solenoid plunger rod 38 within the body of the solenoid 40. As the solenoid plunger rod is drawn into the solenoid, the actuator rod 34 pivots about pivot point 36 and moves the rod 32, and the valve gate 30 connected thereto, outwardly, or away from the groove 26. The groove 26 thus comprises a valve seat and movement of the valve gate out or away from the groove or seat thus opens the valve to allow the passage of waste water, and whatever else may be within the holding tank, to flow through the channel 28 of the valve bosses.

When actuated to open the valve, the solenoid plunger rod 38 moves a distance sufficient to cause a corresponding movement of the actuator rod 34 to completely withdraw the valve gate 30 out of the annular seal 20 so as to provide for the unimpeded flow of sewage or waste through the channel 28 of the valve apparatus. A manual handle 50 is shown in phantom connected to rod 32 for manual actuation of the valve.

The solenoid 40 includes a pair of electrical contacts 44 and 45 to which are connected the source of electrical power to operate the solenoid. The electrical system will be discussed more in detail below in conjunction with FIG. 10.

Figure 2:
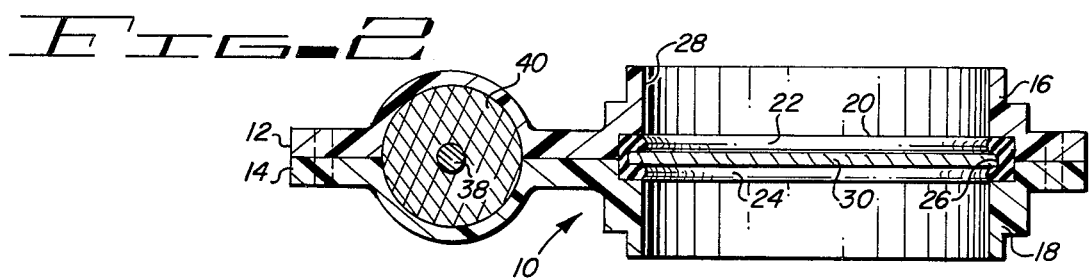
FIG. 2 is a view in partial section of the apparatus of FIG. 1 taken generally along line 2—2 of FIG. 1.

FIG. 2 is a sectional view of the apparatus of FIG. 1 taken generally along the line 2—2 of FIG. 1. The upper housing 12 and the lower housing 14 are shown joined together and the relative locations of the solenoid 40 and the seal 20 are shown. The seal 20 is disposed in a groove at the juncture of the upper and lower housings. The upper boss 16 and the lower boss 18 are in alignment and the interior periphery thereof forms a channel 28 through the valve apparatus for the flow of waste water, sewage, and the like.

Between the upper annulus 22 and the lower annulus 24 of the annular seal 20 is a groove or seat 26. The valve gate 30 extends into the groove or seat 26 to prevent the flow of sewage through the valve apparatus.

Actuation of the solenoid 40 by appropriate switching action results in the movement of the solenoid rod 38 and, through the linkage shown in FIG. 1, the valve gate 30 moves into and away from the groove or valve seat 26 to open and to close the valve apparatus.

Figure 3:
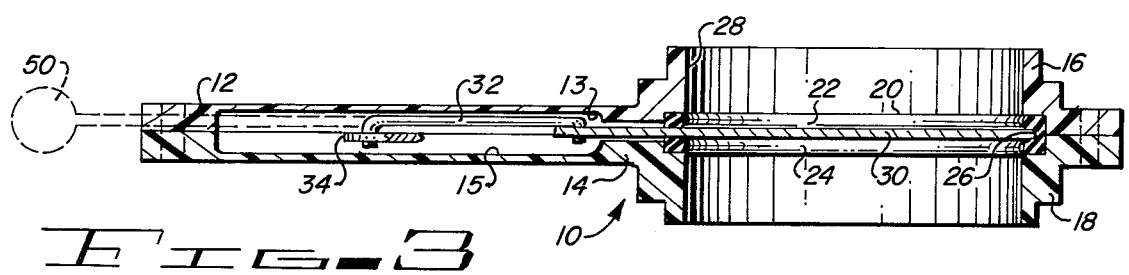
FIG. 3 is a view in partial section of the apparatus of FIG. 1 taken generally along line 3—3 of FIG. 1.

FIG. 3 is a view of the apparatus of FIG. 1 taken generally along line 3—3 thereof. The valve apparatus 10 is shown in partial section. Upper housing 12 and lower housing 14 are shown secured together, with valve gate 30 extending into the groove or valve seat 26. The valve gate 30, with its linkage, such as rod 32 and actuator rod 34, are disposed in matching relieved portions 13 in upper housing and 15 in lower housing 14. The relieved portions 13 and 15 provide sufficient area to allow free movement of the valve gate with its necessary mechanical linkage.

The seal 20 is disposed at the juncture of the housings 12 and 14, with the upper annulus 22 located adjacent the upper valve boss 16 and the lower annulus 24 located adjacent lower valve boss 18. The seal 20 receives the valve gate 30 within the groove or seat 26.

There is shown in phantom an optical handle 50 connected to, or extending from the rod 32 outwardly from the housings 12 and 14. The handle may be used to manually open the valve apparatus in case of electrical failure or some other manfunction. Appropriate means may be employed to lock the handle 50, and thus the valve gate 30, in the open position as desired. When the handle is released, the bias of spring 42 acting on the actuator rod 34 will exert sufficient force on the actuator rod 34, and also on rod 32 through rod 34, to close the valve gate 30 and to maintain it in a closed position, sealingly engaged in the groove or seat 26.

Figure 4:
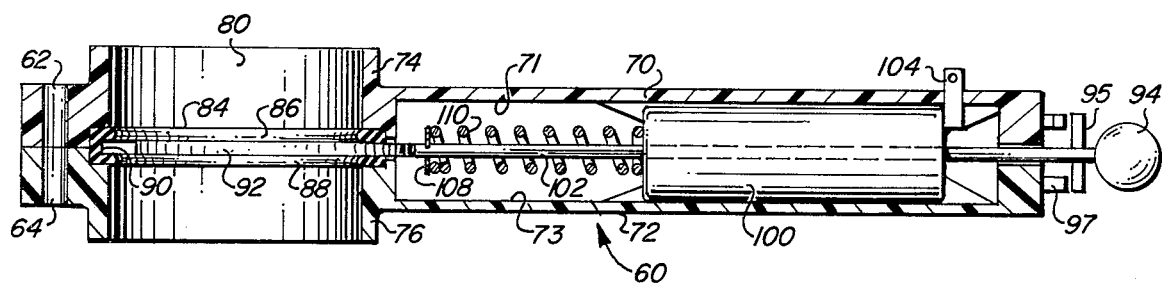
FIG. 4 is a view in partial section of an alternate embodiment of valve apparatus comprising the present invention.

FIG. 4 is a view in partial section of an alternate embodiment of valve apparatus comprising the present invention. Valve apparatus 60 includes an upper housing 70 and a lower housing 72. The upper housing 70 includes an upper valve boss 74 and the lower housing 72 includes a lower valve boss 76. The valve bosses are circular in configuration and are axially aligned to define a channel or passage 80 through which waste water, sewage, and the like flows.

At the juncture of the upper and lower housing at the respective valve bosses is a seal 84, circular or annular in shape, and substantially the same as the seal 20 of FIGS. 1, 2, and 3. The seal 84 includes an upper annulus 86 and a lower annulus 88. Between the upper and lower annuli is a valve groove or seat 90 which receives a valve gate 92.

To secure valve apparatus 60 together, there are a plurality of aligned apertures 62 and 64, extending respectively through the upper and lower housings 70 and 72. Only a single pair is shown. Well-known, appropriate fastening means are inserted therethrough to secure the valve apparatus together.

Within upper housing 70 is a relieved portion 71 and within lower housing 72 is a relieved portion 73. The relieved portions 71 and 73 are matching and aligned, and they receive actuation linkage and a solenoid for movement and actuation of the valve gate 92. A solenoid 100 is disposed within the matching relieved portions of the housings. Extending through the solenoid 100 is a solenoid plunger rod 102 which is connected at one end to valve gate 92, and to a handle 94 at its other end. The portion of the rod 102 secured to the handle 94 extends outwardly or exteriorally of the housings 70 and 72. Appropriate electrical contacts, of which only contact 104 is shown in FIG. 4, are provided to supply electric power to the solenoid 100 to actuate it.

A retainer 108 is secured to the solenoid actuator rod 102 adjacent the valve gate 92. A compression spring 110 is disposed about the rod 102 between the solenoid 100 and the retainer 108. The spring urges the valve gate, secured to the rod 102, into the valve seat or groove 90 to prevent the flow of fluids through the channel or passage 80 of the valve apparatus 60. The rod 102, adjacent handle 94, may be provided with appropriate dogs or protrusions 95 to hold the handle in place as desired for manual actuation. The dogs 95 cooperate with mating catches 97 extending from the housings 70 and 72.

FIG. 5 is a top view of the valve apparatus 60 of FIG. 4. Upper housing 70 is shown with upper valve boss 74 disposed thereon. The channel or passage 80 extends through the valve apparatus and provides a passageway for the flow of sewage, waste water, and the like when the valve apparatus is employed in a use environment. The channel 80 is cylindrical in configuration and is defined by the respective valve bosses which extend through the housings. The valve gate 92 is shown extending most of the way across the channel 80. The valve gate 92 is sealed by the annular seal 80 which is disposed at the juncture of the housings 70 and 72 (See FIG. 4).

The solenoid 100 is shown in phantom, and the solenoid actuator rod 102 is shown extending between the solenoid and the valve gate 92 from one portion of the solenoid, and from the other portion of the solenoid the actuator rod 102 is shown extending outwardly from the housings and terminating in a handle 94. The handle may be employed to manually open or close the valve. A dog 95 on the rod 102 is shown adjacent a catch 97 on vapor housing 70. In order to engage the dogs on the rod 102 and the catches 97 on the housings, the handle and rod must be twisted. Accordingly, there is provided some type of articulation between valve gate 92 and the rod 102 to allow such relative motion without twisting the valve gate.

Electrical contacts 104 and 105 which are used to connect electrical power to the solenoid 100 are shown extending from the upper housing 70. When the electrical power is connected to the terminals 104 and 105, the solenoid 100 is actuated and the solenoid actuator rod 102 is moved with respect to the solenoid to draw the valve gate 92 from the channel or passage 80, thus allowing a flow of sewage therethrough. When the electrical power is disconnected, the valve gate is seated again within the annular seal 84 to close the channel or passage 80. The closing of the valve gate is accomplished by the urging or bias of the spring 110 which extends between the solenoid and a spring retainer 108 secured to the solenoid actuator rod 102. If desired, the valve may be opened and closed manually by means of handle 94 which is secured to the valve actuator rod 102. FIG. 6 is a view in partial section and partially broken away of an alternate embodiment of apparatus comprising the present invention. Valve apparatus 120 includes a motor actuated gate valve which pivots ninety degrees from a fluid passage to completely withdraw itself from the circular aperture through which the sewage flows. The valve is contained within a housing 122.

The housing 122 comprises a pair of parallel side walls 124 and 126, a back wall 128, which extends between the side walls at the rear of the housing, and a curved wall 130 which extends between the side walls 124 and 126 at the front of the valve apparatus 120. The housing is closed at the top by a top plate 132. A valve boss 134, circular in configuration, extends above or upwardly from the top 132. A channel or passage 136 extends through the top 132 and within the valve boss 134 and provides for the passage or the flow of sewage, waste water, and the like, through the valve apparatus. The valve boss and channel, both circular in configuration, are disposed toward the front of the top 132 and adjacent the front wall 130. The front wall is curved generally parallel to the valve boss between the respective side walls.

On the underside of the top 132 and within the housing 122 is a seal 138 which cooperates with a movable valve gate 140 to seal the channel or passage 136 to prevent the flow of fluids therethrough. The seal is generally circular in configuration adjacent the front wall 130, but may be other than circular in configuration adjacent the side walls 124 and 126 and the back wall 128. Thus it may conform to the general configuration of the valve gate 140, or, if desired, it may be circular in configuration and coaxial with the valve boss 134 and the channel 136, but having an enlarged diameter and circumference with respect thereto.

The valve gate 140 is movable on a pin 142 which extends through, or is journaled for movement in, a pair of apertures 144 in the side walls 124 and 126 of the housing 122. The valve gate accordingly pivots from the fully closed situation in the upper position in which it sealingly engages the seal 138 on the underneath side of the top 132 of the housing 122, to the fully open position, which is substantially ninety degrees from the closed position. In the full open position, the valve gate 140 is disposed adjacent the back wall 128 of the housing.

The valve gate 140 is movable by a motor 150 which moves the valve gate through a gear train 160. The motor includes terminals 152, 153, and 154, which are appropriately connected to a source of electrical power through a switch. For convenience, a removable crank 170 may be supplied to move the valve gate 140 manually as desired. The open position of the valve gate 140 is shown in phantom in FIG. 6.

FIG. 7 is a view in partial section of a portion of the valve apparatus 120 of FIG. 6. The view shows the valve gate 140 in the closed position against seal 138, thus preventing the flow of sewage through the channel or passage 136.

In FIG. 7, the upper portion of housing 122 is shown, including one side wall 126, the rear or back wall 128, the front wall 130, and the top 132. Valve boss 134 extends upwardly from the top 132, and the channel or passage 136 extends through the valve boss and the top. Seal 138 is disposed about the channel 136 on the underside of the top 132. In FIG. 7, the valve gate 140 is shown in the closed position against the seal 138.

The valve gate 140 is moved by motor 150, which may be a reversible motor to provide the functions of moving the gate valve both downwardly, and away from the passage 138 to the open position shown in phantom in both FIGS. 6 and 7, and upwardly from the open position, to the closed position as shown in FIG. 7 where the valve gate is shown disposed against seal 138. The motor 150 moves the valve gate through gearing 160. The gearing includes a spur gear 162 keyed to a shaft 151 of the motor 150. The gear 162 meshes with another spur gear 164 keyed to a shaft 167. Another spur gear 166, smaller in diameter than gear 164 and accordingly having less teeth, is also keyed to shaft 167 and accordingly moves when the gear 164 is moved by gear 162. The gear 166 meshes with another spur gear 168 which is secured to the valve gate 140 on shaft 142. Thus the movement of the motor is transmitted through gear 162 to gear 164, and movement of gear 164 on a common shaft 167 with gear 166 results in movement of the gear 166. Gear 166 meshes with gear 168 which is secured to the valve gate 140 and imparts movement to the valve gate 140. If desired, the valve gate 140 could be spring biased in the upper position. Such spring biasing is well known in the art and is accordingly not illustrated in FIG. 7.

Figure 8:
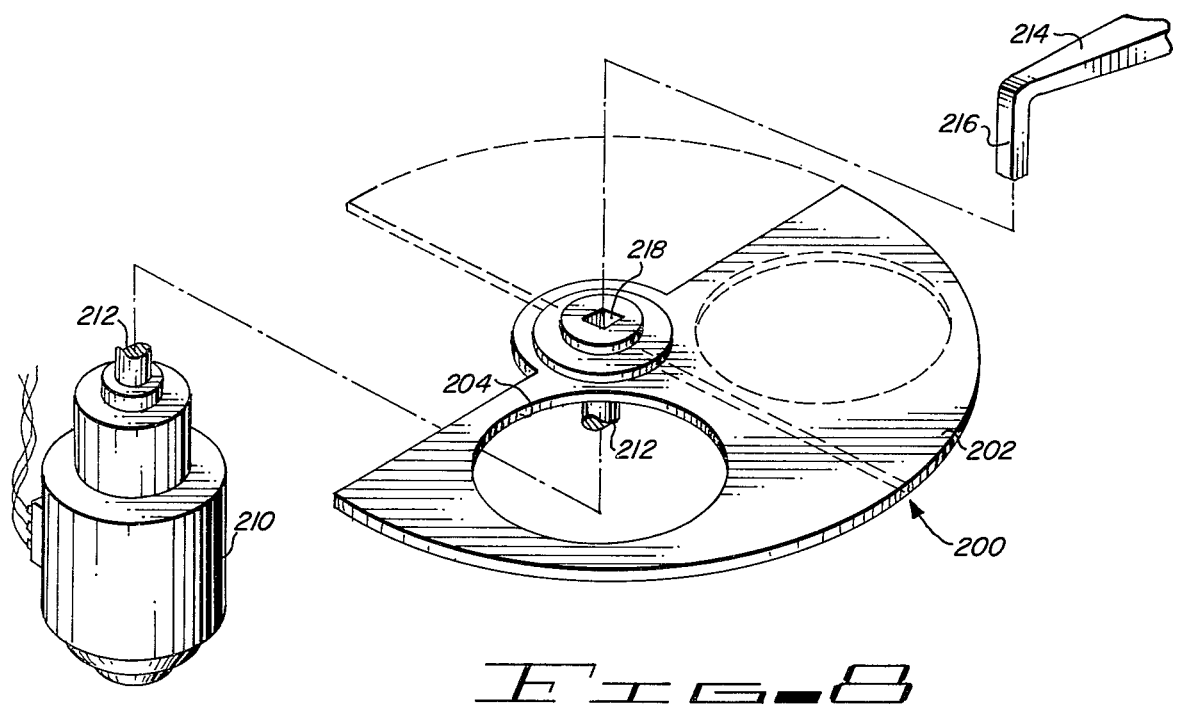
FIG. 8 is a view, partially broken away, of alternate valve actuation apparatus.

FIG. 8 is a view, partially broken away, of valve apparatus 200, also actuable by an electric motor. The valve apparatus 200 includes a valve shutter 202 which is substantially in the configuration of a semicircle or a half moon. The shutter 202 includes a circular aperture 204. When the valve apparatus 200 is actuated to move the shutter to the open position, the aperture 204 is aligned with a holding tank and with appropriate piping, or the like, to allow the flow of sewage therethrough. When the valve apparatus is moved to the closed position, the aperture 204 is moved out of alignment and the solid portion of the shutter 202 is aligned with the piping or a hose and the matching aperture in the holding tank so as to prevent the flow of sewage outward from the holding tank. Obviously, appropriate seals must be provided about the aperture in the holding tank so as to prevent the leakage of fluid from a holding tank around the shutter 202 when the valve apparatus is in the closed position.

The closed position for the apparatus 200 is as shown in FIG. 8, and the open position is as shown in phantom in FIG. 8. The aperture 204 and the shutter are moved approximately ninety degrees counter-clockwise, as shown in FIG. 8, to the open position to align the aperture 204 with a holding tank and a pipe or hose through the appropriate housing, not shown, for the valve apparatus 200.

The shutter 202 is moved by a motor 210 on shaft 212. The shaft 212 is appropriately secured to the shutter 202 and rotary movement of the motor 210 accordingly imparts movement through the shaft 212 to the shutter 202. If desired, and probably preferably, the shutter 202 will include a spring bias to urge the shutter to the closed position so as to maintain the shutter in the closed position when there is no electrical power to the motor 210. Obviously, as in the case of the embodiment of FIGS. 6 and 7, the motor 210 is of the reversible type, controlled through a switch. A reversible motor provides movement of the shutter in two directions, counter-clockwise, shown in FIG. 8 in phantom in the open position, and from the open position shown in phantom to the closed position as illustrated by the solid lines in FIG. 8.

A detachable crank 214 may be used to manually move the shutter as desired. The crank 214 includes a square shank 216 which may be inserted in a matching socket 218 secured to the shaft 212 and to the shutter 202.

Figure 9:
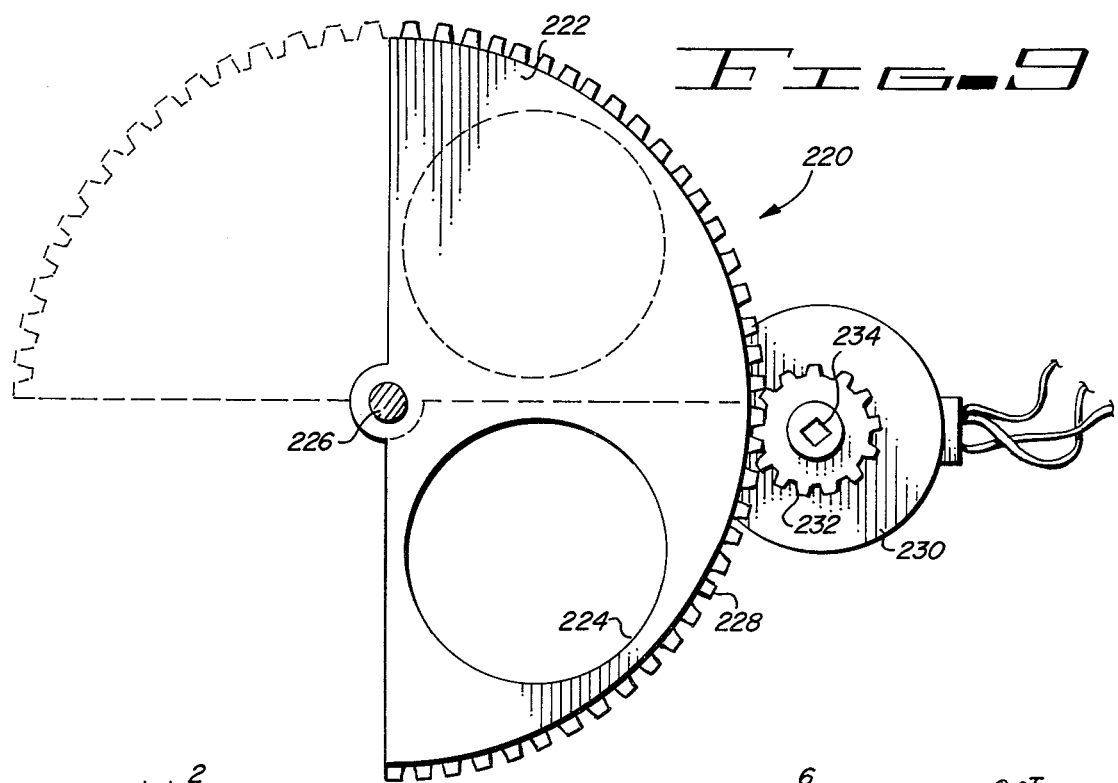
FIG. 9 is a view illustrating the apparatus of FIG. 8.

An alternate embodiment of the apparatus of FIG. 8 is shown in FIG. 9. Valve apparatus 220 includes a shutter 222 with an aperture 224 extending through one portion of the shutter. The shutter 222 is generally in the same configuration as the shutter 202 of FIG. 8, that is, in the form of a half circle or half moon, with the aperture 224 located in one of the halves of the shutter. The shutter pivots about a point on shaft 226.

The discussion regarding an appropriate seal or seals for the shutter 202 in FIG. 8 is appropriate for the shutter 222 in FIG. 9. Obviously, appropriate seal means must be provided to prevent the undesired flow of sewage from a holding tank or other source when the shutter 222 is in the closed position, as illustrated in FIG. 9. When the shutter 222 is moved to the open position, as shown in phantom in FIG. 9, the aperture 224 is aligned appropriately with a matching aperture or hole in a holding tank, or otherwise, or with a pipe, hose, or the like, to which the valve apparatus 220 is secured, and also with an appropriate drain line, hose, or the like, to allow the free flow of sewage or other fluid through the aperture and through the channel in the housing, not shown, for the valve apparatus 220.

The shutter 222 is moved by an electric motor 230. The motor 230 includes a gear 232 which meshes with gear teeth 228 on the exterior periphery of the shutter 222. Accordingly, as the motor 230 is actuated, the rotary movement of the motor is transmitted through a shaft in the motor to spur gear 232 which in turn moves shutter 222 by the external gear teeth on the shutter. In the position shown in FIG. 9, the valve apparatus is in the closed position. Clockwise movement of gear 232 of the motor 230 results in a corresponding counter-clockwise rotation of the shutter 222 through the gear teeth 228 and the shutter is moved to the open position as shown in phantom in FIG. 9. In the open position, the aperture 224 is aligned as discussed above.

The motor 230 includes a square socket 234 which receives a crank substantially the same as crank 214 of FIG. 8. The crank may be used to manually actuate the shutter 222 as desired.

The motor 230, similar to motor 210, is a reversible motor which may be actuated by appropriate switch means to move the motor in both a clockwise and a counterclockwise direction to open and to close the valve apparatus 220. The shutter 222 may also preferably be spring biased to the closed position to maintain the shutter closed when electrical power is disconnected from the motor 230.

Figure 10:
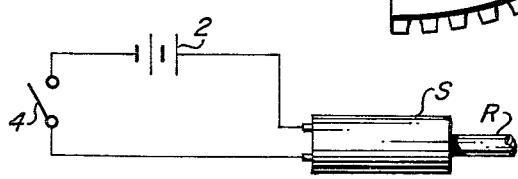
FIG. 10 is an electrical schematic diagram of the apparatus of FIGS. 1–5.

FIG. 10 is a schematic representation of the electrical system required for the apparatus of FIGS. 1-5. The apparatus of FIG. 10 includes a typical solenoid S, which is substantially the same as the solenoid 40 of FIGS. 1 and 2 and the solenoid 100 of FIGS. 4 and 5. A rod R is shown extending from the solenoid S and is substantially the same as the solenoid actuator rods 38 of FIGS. 1 and 2 and 102 of FIGS. 4 and 5. The rod R is moved in response to actuation of the solenoid S as current flows through the solenoid from an electrical source 2 as switch 4 is closed. The electrical source 2 is typically a battery, such as a 12volt battery normally used in recreational vehicles. When the switch 4 is opened, disconnecting the electrical source 2 from the solenoid S, the solenoid rod R is moved by spring action, as explained above in conjunction with FIGS. 1-5. Appropriate conductors are shown in FIG. 10 extending between the solenoid S, the electrical source 2, and the switch 4.

Figure 11:
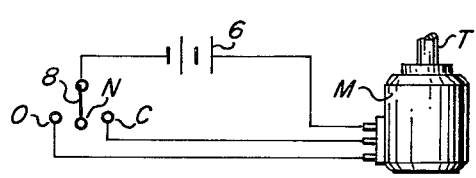
FIG. 11 is an electrical schematic diagram of the apparatus of FIGS. 6–9.

FIG. 11 is a schematic diagram of the electrical circuitry typical of the apparatus illustrated in FIGS. 6-9. It shows a motor M with a shaft T extending therefrom. Rotation of the motor results in rotation of shaft T which in turn results in rotary movement of the appropriate valve apparatus of FIGS. 6 and 7 and of valve apparatus of FIGS. 8 and 9. Since the motor M is a reversible motor, which is used to drive the valve apparatus, such as either the movable valve gate 140 of FIGS. 6 and 7, or the shutters 202 or 222 of FIGS. 8 and 9, an appropriate switch apparatus is required which will drive the motor in two directions, represented by the "close" position and the "open" position of the apparatus of FIGS. 6–9. Accordingly, three terminals are provided for the motor M, a common terminal connected to an electrical source 6, and a pair of terminals extending to switch means 8. The electrical source 6 is typically a 12-volt battery, as discussed above, and as is normally used in recreational vehicles.

The switch 8 may typically be a three position switch, spring loaded to the neutral or N position. When the valve apparatus is to be actuated to the open or on position, the switch 8 is moved to the O terminal, and when the valve apparatus is to be closed, the switch 8 is moved to the C or closed terminal. Connection of the electrical source to the respective O or C terminals drives the motor in the direction appropriately desired, either open or closed. Once the apparatus has been moved either to the open or to the closed position, it will remain in that position until affirmative or positive action is taken to cause the motor to rotate in the opposite direction to move the valve apparatus oppositely. When the switch 8 is released, it moves to the neutral or N position to disconnect the electrical current. If the valve apparatus is in the open position, it will remain in the open position until the switch is actuated to connect the electrical current to the C or closed terminal to rotate the motor in the opposite direction. When the valve apparatus is once again closed, the spring loaded switch will return to the N or neutral position as desired. An appropriate spring bias may preferably be provided to maintain the valve in the closed position when the electrical power has been disconnected from the motor.

Figure 12:
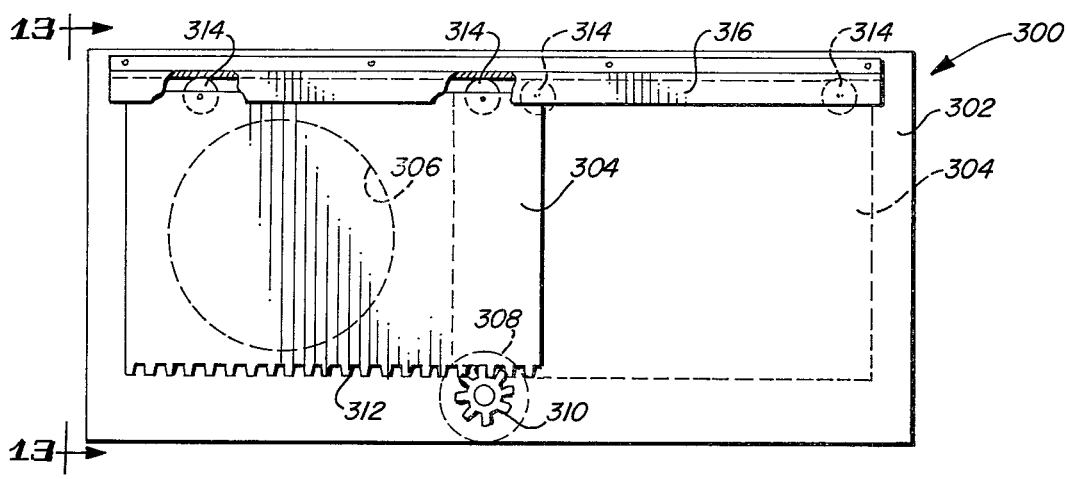
FIG. 12 is a plan view of another alternate embodiment of apparatus embodying the present invention.

FIG. 12 is a plan view of another alternate embodiment of apparatus embodying the present invention, similar to the apparatus of FIG. 9, except that the valve gate is movable on a rack and pinion type gearing arrangement and accordingly moves in a straight line. The valve apparatus 300 includes a housing 302 which is fixed preferably to the holding tank of a recreational vehicle. An appropriate hose or the like interfaces with the apparatus to allow draining of the sewage from the holding tank through the hose. Obviously, appropriate seal means must be employed between the holding tank and the apparatus 300, and between the apparatus 300 and a drain hose or the like.

A valve gate 304 is slidably mounted in the housing 302. The valve gate 304 sealingly covers an aperture 306, shown in phantom, which extends through the housing 302. The aperture 306 comprises a channel or passage through which the sewage and the like from the holding tank flows when the valve gate 304 is moved away therefrom. Obviously, as discussed heretofore, the valve gate 304 will include appropriate sealing apparatus to prevent the undesired flow of waste water, sewage, and the like from the holding tank when the valve gate is in the closed position, as illustrated in FIG. 12.

The valve gate is appropriately guided and held for movement in the housing 302 in order to allow the valve gate to move in a linear fashion on the plate. Movement on the valve gate is accomplished by an electric motor 308 which includes a pinion gear 310 secured to the shaft of the motor. The pinion gear 310 meshes with a rack 312 disposed on one of the edges of the valve gate 304. As illustrated, the valve gate 304 is preferably of a rectangular configuration, and the rack 312 is disposed along one edge thereof.

While the electrical connections have been omitted from the motor 308 illustrated in FIG. 12, it will be obvious that the circuitry associated therewith is substantially as illustrated in FIG. 11. That is, the motor 308 includes appropriate switching apparatus to provide for movement of the valve gate 304 in two directions, one to open the passageway 306 to the flow of fluids and the other to close the aperture or passage 306 by the valve gate 304 to prevent the flow of fluids. As previously described in conjunction with other embodiments herein, provision may be made through either a crank or a cable and crank arrangement to allow the manual movement of the valve gate 304, as desired.

In addition to seal means required with the apparatus, it is obvious that appropriate fastening means may be employed to secure the housing 302 to the holding tank directly, or to some other member of a recreational vehicle associated with the holding tank. Similarly, spring means, such as a spiral spring around the shaft of the motor, may be employed to bias the valve gate to the closed position.

While the rack 312 is disposed along one edge of the valve gate 304, the opposite edge of the plate is appropriately disposed in a track 316, and a plurality of wheels 314 are secured to the plate and journaled for rotation within the track 316. Movement of the plate 304 is accordingly enhanced by the use of the rollers and the track. Obviously, additional guide means, such as another track, substantially parallel to track 316, may be provided for supporting and guiding the plate 304 adjacent the rack 312. Such has not been shown in FIG. 12 or in FIG. 13. Moreover, additional bearing or roller system for the plate 304 other than disclosed in FIGS. 12 and 13 may be provided. Movement of the plate 304 away from the aperture 306 is shown in phantom in FIG. 12, including movement of the wheels 314 in track 316.

Figure 13:
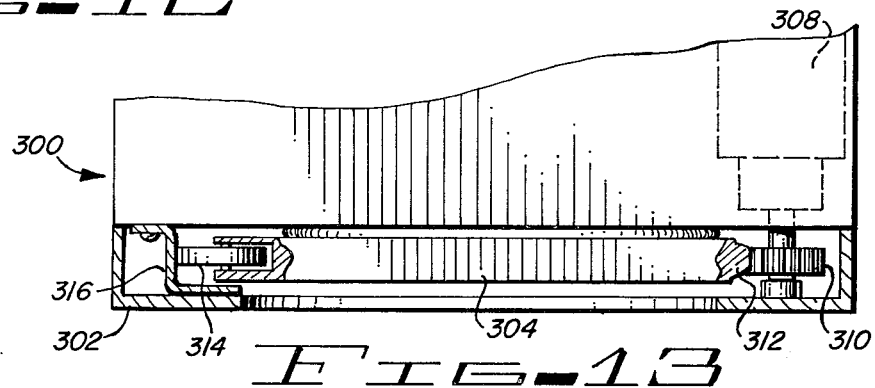
FIG. 13 is a broken view of the apparatus of FIG. 12 taken generally along the line 13–13 of FIG. 12.

FIG. 13 is a view of the apparatus of FIG. 12 taken generally along line 13—13 of FIG. 12. The valve apparatus 300 is shown in more detail, with respect to the plate 302 of a holding tank, and the valve gate 304 secured thereto with appropriate seal means disposed between the holding tank and the valve gate. Track 316 is secured to the plate 302 and a roller 314 is shown secured to the valve gate 304 and disposed guided and movable within the track 316.

Rack 312 is disposed on one edge of the valve gate 304 and it meshes with a pinion gear 310 secured to a shaft of motor 308. Movement of the motor results in movement of the pinion 310 and accordingly results in movement of the valve gate 304 with respect to the plate 302.

Figure 14:
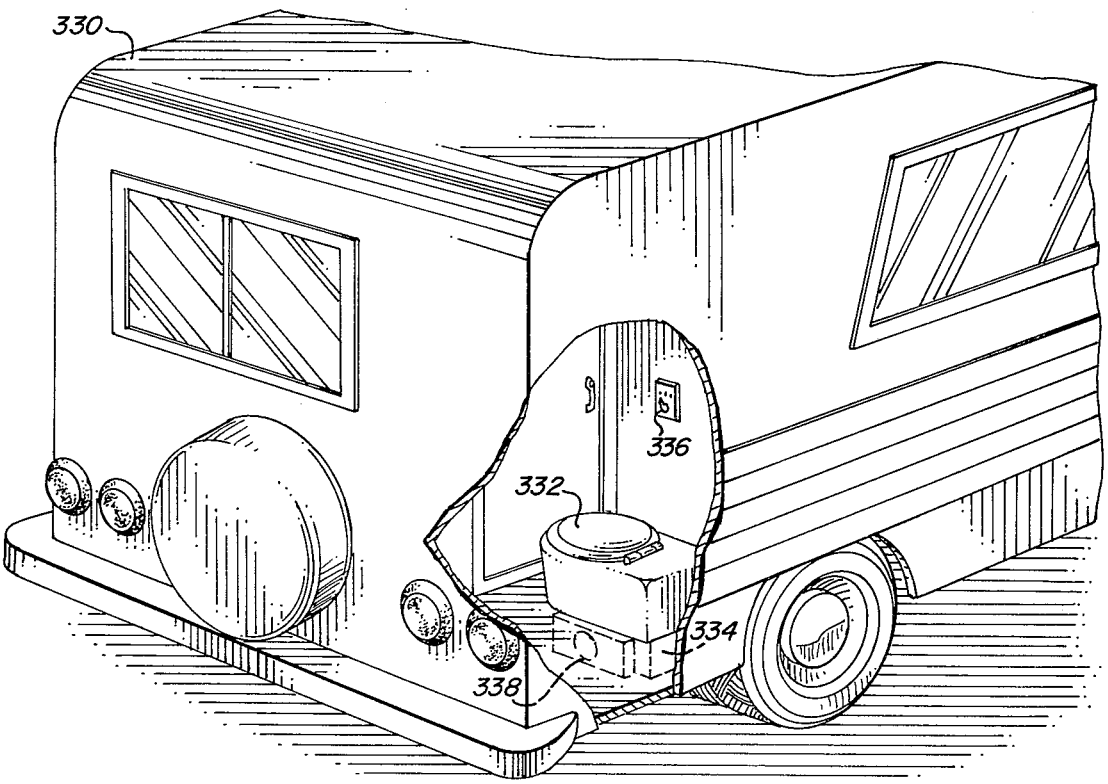
FIG. 14 is an isometric view of a portion of a recreational vehicle, partially broken away, showing the apparatus of the present invention in a use environment.

FIG. 14 is an isometric view of a recreational vehicle showing the valve apparatus disclosed herein in the use environment. A recreational vehicle 330 is shown with a portion cut away to disclose a toilet 332 within the vehicle. A holding tank 334 is disposed beneath the toilet 332 and holds sewage therefrom, and also waste water from a shower, if such is installed in the vehicle, and a sink. The valve apparatus 338, of the type disclosed herein, is disposed beneath the holding tank 334. The valve apparatus 338 is of the electromechanical type described herein and is actuable by a switch 336 secured to a wall within the recreational vehicle 330. As illustrated, the switch 336 is a three-position switch, of which one position is the neutral or "off" position. The other two positions are accordingly used to open and to close the valve apparatus. If desired, a remote controlled manually actuable mechanical crank apparatus may also be disposed within the vehicle to allow for the remote actuation of the valve apparatus by manual means.

The valve apparatus 338 shown disposed beside holding tank 334 includes housing means, as discussed throughout the specification, and as illustrated in some of the embodiments. It will be understood that the provision of such housing means is applicable to all embodiments, regardless of the specific embodiment, in order to provide a channel through which the sewage, waste water, and the like flows between the holding tank and an appropriate drain hose, and to thus confine the waste water, sewage, and the like as drainage and flushing of the holding tank is accomplished.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. For example, two way solenoids may be employed with the present invention, the electric motors illustrated could have automatic stops built into them to automatically stop the valve gates at predetermined limits, and cables could be used to manually crank the valve gates open from locations. Moreover, transformers, rectifiers, and the like may be employed as desired to allow use of 110 volt electrical systems in addition to the typical 12 volt systems used in recreational vehicles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Electromechanical valve apparatus for use with a holding tank of a recreational vehicle, comprising, in combination:

housing means secured to the holding tank including a passage for the flow of fluids therethrough;

gate means secured to the housing means and movable with respect to the passage to control the flow of fluids through the passage, including a valve gate, a rod secured to the valve gate and movable relative thereto for moving the valve gate, and a handle secured to the rod for manual actuation of the gate means;

locking means including a portion secured to the housing and a portion secured to the rod engageable upon relative movement of the rod with respect to both the valve gate and the housing to prevent movement of the valve gate;

electromechanical means for moving the gate means, including a solenoid disposed about a portion of the rod; and switch means for connecting and disconnecting a source of electrical energy to the electromechanical means.

2. The apparatus of claim 1 in which the housing means comprises an upper housing and a lower housing; and the gate valve is slidable within the upper and lower housings.

3. The apparatus of claim 2 in which the electromechanical means further includes spring means for biasing the gate valve to prevent the flow of fluids through the passage.

* * * * *